May 13, 1941.  C. R. SMALLEY  2,242,046
POWER UNIT FOR MOTOR VEHICLES
Filed June 18, 1940
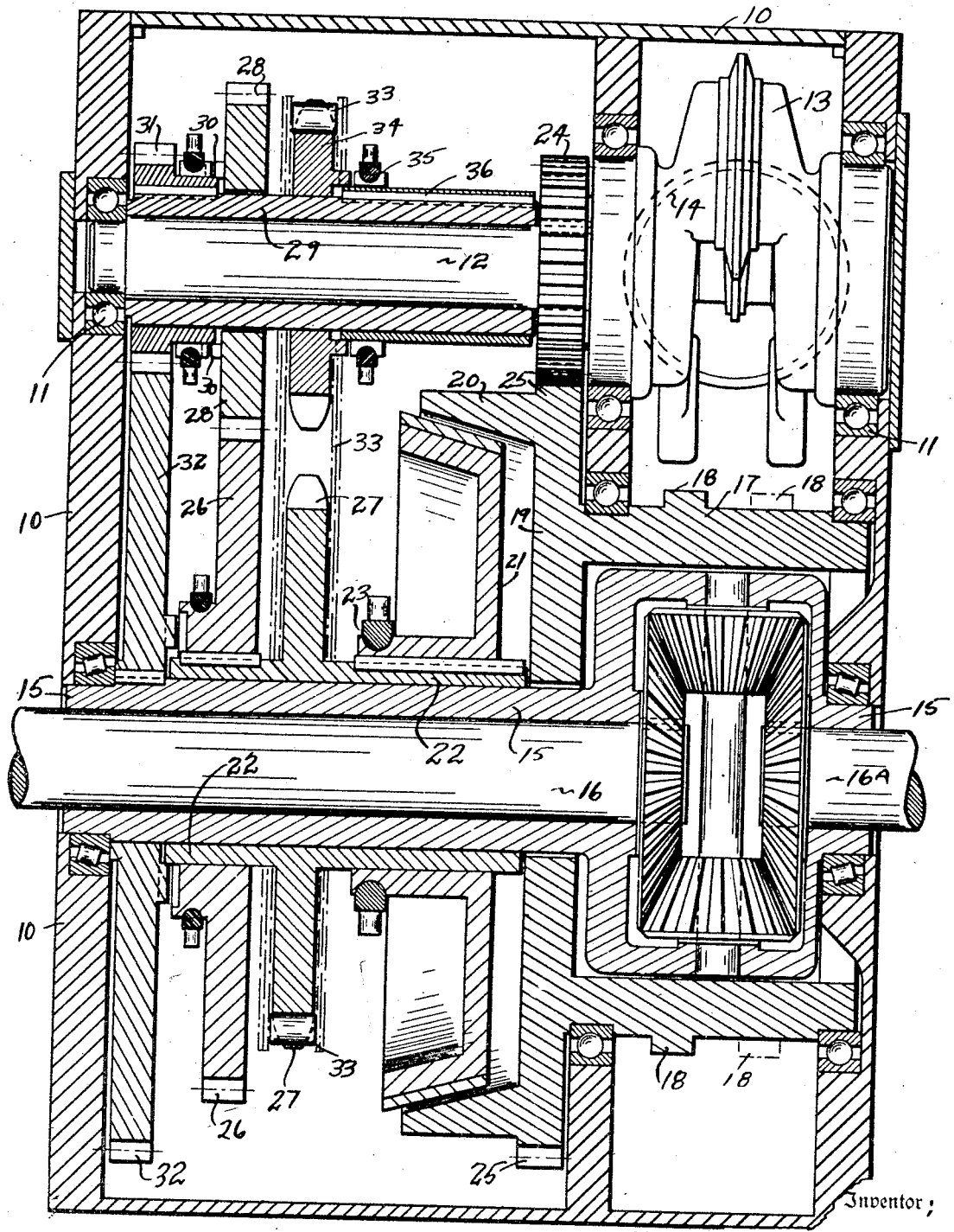
Inventor:
Charles R. Smalley,
By
W. B. Harpman
Attorney.

Patented May 13, 1941

2,242,046

UNITED STATES PATENT OFFICE 2,242,046

POWER UNIT FOR MOTOR VEHICLES

Charles R. Smalley, Youngstown, Ohio

Application June 18, 1940, Serial No. 341,156

5 Claims. (Cl. 180—70)

This invention relates to a power unit.

The principal object of this invention is the provision of a power unit which includes motor, transmission, differential and clutches and which is adapted to be installed between two oppositely disposed road wheels of a motor vehicle and when properly connected to them will drive them at various controlled speeds with a minimum of gearing, shafting, vibration and power loss.

A further object of the invention is the provision of a power unit so formed that motor vibrations arising therefrom will be distributed lengthwise in relation to the motor vehicle in which the power unit is installed or in vertical relation thereto thus making the vibrations much less noticeable.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawing, wherein the figure is a cross sectional side elevation of the power unit.

By referring to the drawing it will be seen that the power unit comprises a casing 10 in which there is positioned by means of suitable bearings 11 a crank shaft 12, the crank portion 13 of which is formed in operative relation to an inner end of a cylinder 14 which is adapted to receive a conventional piston and connecting rod so that the crank shaft 12 may be revolved by combustion within the said cylinder 14. Positioned within the casing 10 and on the same plane or in parallel relationship to the crank shaft 12 there is a tubular differential case 15 in which there are positioned axles 16 and 16A. It will also be seen that a tubular cam shaft 17 is rotatably positioned around the tubular differential case 15 adjacent the crank 13 of the crank shaft 12 and that a pair of valve actuating cams 18 are formed on this tubular cam shaft 180° apart. Positioned on this tubular cam shaft and forming a part thereof there is a flywheel 19 carrying a portion of a clutch 20 which is adapted to engage a portion 21 of a clutch which is itself splined to a main driving sleeve 22 rotatably mounted on the tubular differential case 15. Means enabling the remote control through suitable levers of the clutch portion 21 are provided in the form of an annular ring shaped groove 23 so that the clutch assembly may be operated from a remotely positioned pedal. In connection with the timing cams 18 formed on the tubular cam shaft 17, it will be seen that the same receives movement from the crank shaft 12 by way of gears 24 and 25 formed upon the crank shaft and flywheel, 12 and 19 respectively, and are therefore the timing gears of the motor. It will thus be seen that while in a conventional motor the timing gears have a two to one ratio and one set of cams to properly time the motor, this motor unit has timing gears of four to one ratio and two sets of cams in order to properly time the motor. It will thus be seen that the revolving movement of the crank shaft 12 is conveyed through the timing gears 24 and 25 to the tubular cam shaft 17 and effectively move the cams 18. It will be observed that the cam action may be directly imparted by push rods to the valves of the cylinder 14 and that, if necessary with various types of cylinder assemblies, rocker arms may be employed to operate the valves of the motor. In order that movement of the crank shaft 12 may be imparted to the tubular differential case 15 through several selective gear ratios a plurality of gears are positioned on both the crank shaft 12 and the tubular differential case 15 so that by utilizing certain predetermined selections thereof various desirable gear ratios may be obtained and the movement of the crank shaft 12 and the flywheel 19 may be imparted by the clutch portions 20 and 21 and subsequently to the axles 16 and 16A therein. These various gears comprise a main driving sleeve 22 rotatably positioned on the tubular differential case 15 and a gear 26 and a sprocket 27, the gear 26 being splined to the rotatable main driving sleeve 22 and the sprocket 27 being formed on the sleeve 22. The gear 26 is positioned so as to mesh with a low speed idler gear 28 rotatably positioned on a spur gear sleeve 29 which is rotatably positioned upon the crank shaft 12. Jaw clutches 30 splined to the spur gear sleeve 29 serve to connect or disconnect the same with the low speed idler gear 28 so that motion originating in the crank shaft 15 is conveyed through the flywheel and clutch assemblies and through the main driving sleeve 22 and gears 26 and 28 to the spur gear sleeve 29. In order that the motion thus imparted to this spur gear sleeve 29 may reach the tubular differential case and move axles 16 and 16A therein by way of a suitable differential, as shown, the spur gear sleeve 29 is provided with a gear 31 adapted to mesh with a drive gear 32 which is fixed to the tubular differential case 15. The ratio of the gears 31 and 32 when utilized in the manner described by the engagement of the jaw clutches 30 results in a low gear ratio imparted the axles 16 and 16A.

A high gear ratio is obtained by simply moving the gear 26 which is splined to the main driving sleeve 22 into the jaw clutch engagement with the sides of the drive gear 32. This results in the direct connection of the main driving sleeve 22 with the tubular differential case 15 and motion is thus directly imparted to the axles 16 and 16A in a four to one high gear ratio. It will thus be seen that by placing wheels on the outermost ends of the axles 16 and 16A that motion imparted to the crank shaft 12 by one or more internal combustion cylinder assemblies in connection therewith will suitably drive the said wheels in conventional high gear.

In order that a reverse gearing may be obtained the sprocket 27 fixed on the main driving sleeve 22 is connected by a chain 33 to a reverse idler sprocket 34 rotatably positioned on the spur gear sleeve 29 and the motion of the reverse idler sprocket 34 may be imparted by means of a jaw clutch 35 splined on a tubular spacer portion 36 which is in turn splined to the spur gear sleeve 29. Thus the motion of the main driving sleeve 22 is conveyed by way of the fixed gear 27, the chain 33, the idler sprocket 34, the clutch 35, and the spacer portion 36 to the spur gear sleeve 29 from which the reverse motion is conveyed through the gears 31 and 32 to the tubular differential case.

It will thus be seen that by combining various parts of a conventional motor, transmission, differential and other allied parts that various portions of the power unit serve dual purposes and that the resulting mechanism is compact, efficient, and comprises a relatively few moving parts. It will also be observed that the assembly, encloses as it is in the casing 10, may be either bolted securely to the car frame or movably mounted in relation thereto. It will thus be seen that the power unit shown and described herein possesses certain inherent advantages not heretofore found in similar units. These advantages reside primarily in the centralization of the moving parts of the unit and in the simplicity of design and directness of action resulting therefrom. There is also an obvious saving in manufacturing cost as well as in material and in weight when comparing this unit with others known to the art. The efficiency of the complete unit with its minimum number of moving parts results in a savings in operation to the ultimate user. Primarily however, the principal point of novelty is the compactness of the entire power unit as it may quite readily be formed with an over-all length of axles of approximately twelve inches thus permitting it to be installed midway between a pair of road wheels and suitably connected thereto through suitable yielding linkage.

What I claim is:

1. A power unit including an internal combustion engine, clutch, differential, and transmission means adapted to be positioned between a pair of oppositely disposed road wheels of a motor vehicle so as to suitably drive the same and comprising a crank shaft and an axle positioned in a housing in spaced and parallel relationship, a tubular cam shaft rotatably positioned around the said axle, a flywheel and a valve timing gear formed on the said tubular cam shaft, a plurality of cams formed on the said tubular cam shaft, clutch means positioned on the said flywheel adjacent to engaging clutch means slidably positioned on a main driving sleeve rotatably positioned on the said axle, a spur gear sleeve rotatably positioned on the said crank shaft together with a plurality of gears positioned on each of the said sleeves whereby suitable gear ratios may be obtained and applied to the said axle by means of a gear positioned thereon and meshed with a gear fixed on the said spur gear sleeve, motion of the crank shaft being imparted to the said flywheel and through the said clutch to the said main driving sleeve and from the said main driving sleeve through the selective gear assemblies to the said axle.

2. A power unit including an internal combustion engine, clutch, differential, and transmission means adapted to be positioned between a pair of oppositely disposed road wheels of a motor vehicle so as to suitably drive the same and comprising a crank shaft and a pair of axles positioned in a housing in spaced and parallel relationship, said axles driven through differential gears and enclosed in a tubular differential case positioned in the said housing, a tubular cam shaft rotatably positioned around the said differential case, a flwheel and a valve timing gear formed on the said tubular cam shaft, a plurality of cams formed on the said tubular cam shaft, clutch means positioned on the said flywheel adjacent to engaging clutch means slidably positioned on a main driving sleeve rotatably positioned on the said tubular differential case, a spur gear sleeve rotatably positioned on the said crank shaft together with a plurality of gears positioned on each of the said sleeves whereby suitable gear ratios may be obtained and applied to the said tubular differential case by means of a gear positioned thereon and meshed with a gear fixed on the said spur gear sleeve, motion of the crank shaft being imparted to the said flywheel and through the said clutch to the said main driving sleeve and from the said main driving sleeve through the selective gear assemblies to the said tubular differential case and axles therein.

3. A power unit including an internal combustion engine, clutch, differential, and transmission means adapted to be positioned between a pair of oppositely disposed road wheels of a motor vehicle so as to suitably drive the same and comprising a crank shaft and a flywheel having clutch means formed thereon rotatably positioned around a tubular differential case and meshed with a gear formed on the said crank shaft, a main driving sleeve rotatably positioned on the said differential case and clutch means splined thereto adapted to engage the clutch means formed on the said flywheel so that motion of the said crank shaft is conveyed through the said flywheel and clutches to the said main driving sleeve, a spur gear sleeve rotatably positioned on the said crank shaft together with a plurality of gears positioned on each of the said sleeves whereby suitable gear ratios may be obtained and applied to the said tubular differential case by means of a gear positioned thereon and meshed with a gear fixed on the said spur gear sleeve, motion of the crank shaft being imparted to the said flywheel and through the said clutch to the said main driving sleeve and from the said main driving sleeve through the selective gear assemblies to the said tubular differential case and axles therein.

4. A power unit comprising an internal combustion engine and differential and selective gear transmission means adapted to be positioned between a pair of oppositely disposed road wheels of a motor vehicle so as to suitably drive the same and include a crank shaft and a pair of axles positioned in spaced and parallel relationship the said axles enclosed in a tubular differential case, a tubular cam shaft having a flywheel formed thereon rotatably positioned around said tubular differential case and adjacent the said crank shaft and adapted to be driven thereby, a main driving sleeve rotatably positioned on the said tubular differential case and clutch means formed on the said flywheel and main driving sleeve so that motion of the flywheel may be imparted to the driving sleeve therethrough, a spur gear sleeve rotatably positioned on the said crank shaft, a sprocket formed on the said main driving sleeve adapted to be connected to a secondary sprocket formed on the said spur gear sleeve by means of a driving chain, means for connecting the said secondary sprocket to the said spur gear sleeve, said means comprising a spacer sleeve splined to the said spur gear sleeve and adapted to be jaw clutched to the said secondary sprocket, drive gear means formed on the said tubular differential case and on the said spur gear sleeve so that motion imparted to the said spur gear sleeve is conveyed to the said tubular differential case, a gear splined to the said main driving sleeve and meshed with a low speed idler gear rotatably positioned on the said spur gear sleeve, jaw clutches formed on the said spur gear sleeve adapted to engage the said low speed idler gear so that motion of the said main driving sleeve may be conveyed thereby to the said spur gear sleeve together with jaw clutches splined to the said main driving sleeve adapted to engage the said drive gear affixed to the said tubular differential case so that motion of the main driving sleeve may be imparted directly to the said differential case.

5. A power unit comprising an internal combustion engine and selective gear transmission and clutch and differential means incorporated with a housing and adapted to be positioned between a pair of oppositely disposed road wheels of a motor vehicle and comprising a drive shaft and a driven shaft in spaced and parallel relationship, said drive shaft having a crank formed therein to receive power impulses so as to revolve the drive shaft, the driven shaft enclosed in a tubular differential case and connected thereto through differential gears, a hollow cam shaft positioned around the said tubular differential case, cams formed thereon adapted to operate the valves of the said engine, a flywheel and part of a clutching assembly formed as a part of the cam shaft and a main driving sleeve rotatably positioned on the said differential case adjacent the said flywheel portion of the cam shaft, a portion of the clutch splined to the said main driving sleeve so that motion of the flywheel may be imparted therethrough, said flywheel meshed with a gear formed on the said drive shaft adjacent the crank thereof, a sprocket fixed to the said driving sleeve and a gear splined to the main driving sleeve, both gear and sprocket adapted to impart motion to an idler gear and reverse idler sprocket rotatably positioned on a spur gear sleeve on the said drive shaft, the sprocket imparting motion by way of a chain engaging the said reverse idler sprocket and the gear meshed with the said idler gear, jaw clutches splined to the said spur gear sleeve so that either the gear or the sprocket may be connected thereto and drive gears formed on the spur gear sleeve and the tubular differential case so that motion imparted to the spur gear sleeve may be conveyed to the tubular differential case together with jaw clutches splined to the main driving sleeve adapted to engage the said tubular differential case so as to impart motion directly thereto, the said drive shaft and driven shaft and gearing assemblies positioned in a housing, the end walls and a partition of which form a supporting structure for the various operatable parts therein.

CHARLES P. SMALLEY.